United States Patent [19]

Smith et al.

[11] Patent Number: 4,537,914

[45] Date of Patent: Aug. 27, 1985

[54] FLOOR CLEANING AND WAXING COMPOSITION

[75] Inventors: James A. Smith, Old Tappan; Betty J. Murphy, Upper Montclair, both of N.J.

[73] Assignee: Creative Products Resource Associates, Ltd., Clifton, N.J.

[21] Appl. No.: 688,864

[22] Filed: Jan. 4, 1985

Related U.S. Application Data

[63] Continuation-in-part of Ser. No. 511,185, Jul. 6, 1983, , and a continuation-in-part of Ser. No. 660,350, Oct. 12, 1984.

[51] Int. Cl.$^3$ .............................. C08J 9/38; C08J 9/40
[52] U.S. Cl. ........................................ 521/111; 15/3; 51/308; 134/7; 134/36; 134/40; 264/45.3; 264/140; 264/144; 427/140; 427/154; 427/291; 427/325; 427/334; 521/52; 521/76; 521/122; 521/123; 521/159; 521/905; 521/918; 252/90; 252/91; 252/174; 252/DIG. 2
[58] Field of Search ................ 521/111, 122, 123, 76, 521/159, 905, 918; 15/3; 51/308; 134/7, 36, 40; 264/45.3, 140, 144; 427/140, 154, 291, 325, 334

[56] References Cited

U.S. PATENT DOCUMENTS

| | | | |
|---|---|---|---|
| 2,789,953 | 4/1957 | Blackman | 252/88 |
| 3,088,158 | 5/1963 | Boyle et al. | 15/506 |
| 3,242,109 | 3/1966 | Showalter | 521/122 |
| 3,533,953 | 10/1970 | Mills et al. | 252/88 |
| 3,598,772 | 8/1971 | Hood et al. | 521/170 |
| 3,810,841 | 5/1974 | Richter | 252/91 |
| 3,833,386 | 9/1975 | Wood et al. | 106/41 |
| 3,861,993 | 1/1975 | Guthrie | 161/159 |
| 3,888,766 | 6/1975 | De Young | 521/905 |
| 3,890,254 | 6/1975 | Guthrie | 521/159 |
| 4,059,666 | 11/1977 | Fowler | 264/129 |
| 4,066,394 | 1/1978 | Leonard | 8/137 |
| 4,066,578 | 1/1978 | Murch et al. | 521/123 |
| 4,127,515 | 11/1978 | MacRae et al. | 521/111 |
| 4,137,200 | 1/1979 | Wood et al. | 521/159 |
| 4,160,076 | 7/1979 | Guthrie et al. | 521/159 |
| 4,271,272 | 6/1981 | Strickman et al. | 521/905 |
| 4,309,509 | 1/1982 | Wood | 521/132 |
| 4,343,910 | 4/1982 | Bush, Jr. et al. | 522/82 |
| 4,421,526 | 12/1983 | Strickman et al. | 51/296 |

*Primary Examiner*—Morton Foelak
*Attorney, Agent, or Firm*—Merchant, Gould, Smith, Edell, Welter & Schmidt

[57] ABSTRACT

An absorbent floor cleaning and waxing composition is disclosed comprising shreds of a hydrophilic, open-celled, solids-loaded polyurethane foam having an aqueous wax emulsion releasably incorporated therein. The composition is effective to replace soiled coatings of floor wax with fresh floor wax.

14 Claims, No Drawings

FLOOR CLEANING AND WAXING COMPOSITION

Cross Reference To Related Applications

This application is a continuation-in-part of U.S. application Ser. No. 511,185, filed July 6, 1983, and a continuation-in-part of U.S. application Ser. No. 660,350, filed Oct. 12, 1984.

BACKGROUND OF THE INVENTION

A variety of wax compositions are available, which when applied to flooring materials such as wood, tile, linoleum and the like, act to shine the flooring, while rendering it scuff- and scratch-resistant. However, since waxy materials tend to adhere and absorb solid and oily dirt, over time the shiney wax film becomes marked and darkened. Therefore, to thoroughly clean such flooring, it is commonly necessary to remove the coating of old wax prior to application of a fresh floor wax. This wax-removal step can be accomplished by treatment of the waxed flooring with various detergent compositions.

Although floor wax compositions are commonly available as liquids, a number of solid-type products have been designed to overcome the disadvantages of bulk liquid waxes, such as over- or under-application, spillage and the like. Such products include sponges which are intended to deliver aqueous wax dispersions when wetted. For example, U.S. Pat. No. 4,127,515 discloses a polyurethane sponge formed to incorporate an aqueous dispersion containing a wax, a surfactant, and optionally, small amounts of a finely-divided abrasive. U.S. Pat. No. 3,088,158 discloses a car-waxing sponge impregnated with an oil-in-water emulsion of a silicone and/or paraffin oil and a mixture of surfactants. While such products may function to deliver a wax coating to various substrates while exhibiting some detersive action, they do not address the need to both strip flooring of aged, soiled wax while simultaneously depositing a coating of fresh wax.

BRIEF DESCRIPTION OF THE INVENTION

The present invention provides a solid cleaning and waxing composition which acts to loosen and pick up layers of soiled floor wax while simultaneously depositing a fresh coating of wax on the flooring. The composition comprises hydrophilic, open-celled polyurethane foam shreds which incorporate an aqueous phase and abrasive particles coupled within the cell walls. The foam shreds also incorporate a wax which is partially released from the shreds as an aqueous emulsion when the shreds are contacted with the flooring under conditions of pressure. The foam shreds need not be pre-wetted or otherwise "activated" prior to use.

The wax can be incorporated into the foam shreds by emulsifying or dispensing the wax in an aqueous phase which is absorbed into the cells of the foam shreds. Since this carried aqueous phase is post-added to the cured foam shreds, it may be referred to as the "exterior aqueous phase" as opposed to the interior aqueous phase which is integrally incorporated into the foam matrix. However, it is preferable that a major portion, and most particularly, all of the wax be dispersed or otherwise incorporated in the interior aqueous phase. This can be readily accomplished by incorporating the wax into the aqueous reactant phase which is used to produce the foamed polyurethane bodies which in turn yield the carrier shreds. The aqueous reactant phase can also incorporate cleaning (wax-removing) and/or foam-structuring adjuvants such as surfactants, silicone oil, organic solvents and the like.

When applied to soiled waxed flooring, the foam shreds scour the surface and can release surfactants and solvents which help to break up the old wax coating, which then becomes adhered to the foam matrix. The pressure imparted by the application device, such as the sweeper or buffer, also results in the release of an amount of the aqueous wax emulsion from the shreds which is effective to apply a fresh coating of wax or "floor polish" to the flooring. The shreds retain their structural integrity during the cleaning process and can be easily swept up or otherwise removed from the floor without clumping or sticking.

The foam carrier shreds useful in the present compositions are prepared by foaming a polyurethane prepolymer resin which contains at least two free isocyanate groups per resin molecule with an aqueous reactant phase comprising a slurry of solid abrasive particles. The solid particles will also have been pre-treated with a silane-coupling agent which functions to bind the particles into the polyurethane foam matrix. Although polyurethane foams useful in the present invention may be foamed from aqueous slurries which comprise up to about 80% by weight of the silane-treated particles, an amount of abrasive equal to about 30–75% of the total slurry weight is preferred, since this range of particles resists separation from the polymeric matrix when the foam shreds are spread over the floor and removed, while imparting effective scouring power to the cleaning composition. The aqueous slurry of abrasive particles is combined with the prepolymer resin so that the final mole ratio of water to the total free isocyanate groups on the prepolymer molecules is within the range of about 5–100:1. These amounts of water react with the free isocyanate groups to release carbon dioxide which blows the prepolymer into a cross-linked, open-celled foam which is rendered hydrophilic by entrapment of excess water in the cell walls of the foam matrix. When the prepolymer-slurry mixture is allowed to set in molds, a dense, friable foam bun is formed which is easily shredded or chopped into foam particles of the desired size. As used herein, the term "bun" is intended to include any of the foamed bodies which may be shredded to yield the present product, such as films, slab stock, and the like.

The substantially integral incorporation of the interior aqueous phase into the foam matrix also leaves the open cellular voids largely clear and available to absorb the exterior aqueous phase, if used. The open cells also enhance the ability of the composition to pick up the remnants of the previous floor wax.

DETAILED DESCRIPTION OF THE INVENTION

The floor cleaning composition of the present invention is prepared by a process comprising forming an aqueous slurry which includes solid abrasive particles which have been treated with a silane-coupling agent. Preferably the slurry also includes wax and an amount of surfactant effective to form an open-celled foam upon reaction of the aqueous phase with a water-foamable polyurethane prepolymer resin. The surfactant can also function to allow the composition to wet and disperse or dissolve the old wax.

The aqueous phase may further comprise additional foam-forming and structuring agents such as silicone fluids, additional surfactants, suspending agents, organic solvents and the like which also can act to build the cleaning power of the finished composition. The fully-formed aqueous slurry is then combined with a water-foamable prepolymer resin and the reaction mixture allowed to foam and cure to form a self-cross-linked, open-celled, friable polyurethane bun. The bun is chopped or shredded to form absorbent, highly reticulated shreds. Alternatively, all or a part of the wax can be absorbed into the shreds at this point, preferably as an emulsion or dispersion in the exterior aqueous phase.

Pre-Polymer Resin

The preparation of open-celled, hydrophilic polyurethane foams by the reaction of specially-formulated prepolymer resins with large excesses of water without the need for added catalysts or cross-linking agents is disclosed in U.S. Pat. Nos. 3,890,254; 4,137,200 and 4,160,076. These resins permit the introduction of large amounts of solids into the foam matrices via preformed aqueous slurries of solid particles which are subsequently reacted with the prepolymer resin in order to foam it into the desired products. A preferred class of water-foamable prepolymer resins which yield cross-linked, hydrophilic polyurethane foams upon the addition of water are those belonging to the commercially-available Hypol ® series, available from W. R. Grace & Co. (FHP 3000, 2000, 2000 HD, 2002) and which are generally described in U.S. Pat. No. 4,137,200, the disclosure of which is incorporated by reference herein. These liquid resins are prepared by capping mixtures of polyols having 3-8 hydroxyl groups and polyoxyethylene diols with toluene diisocyanate. The capped alcohol mixtures have an average number of free isocyanate groups per molecule which is equal to two or more, i.e., 2-8.

These resins possess molecular weights within the range of about 1300-1400 and have about 1.5-2.5 mEq./g. of free isocyanate groups. Upon being contacted with a molar excess of water, the isocyanate groups hydrolyze to release carbon dioxide gas, thus foaming the resin without the need for added catalysts or blowing agents. The free amino groups formed by the hydrolysis reaction react with unhydrolyzed isocyanate groups to form ureido groups which cross-link and stabilize the foam, while entrapping a part of the excess water in the cell walls, where it acts to enhance the hydrophilic properties of the foam. The compatibility of the foam matrix with large molar excesses of water is a necessary requirement of resins useful in the practice of the present invention, since large amounts of water are needed to uniformly introduce large amounts of abrasive material and wax into the matrix.

In the practice of the present invention, useful foams may be formed by combining water with prepolymer resin in a weight ratio of water to polymer of 0.5-3.0:1, preferably 0.5-2.75:1. These ranges yield a mole ratio of water to free isocyanate groups of about 5-100:1, preferably about 10-70:1.

Particulate Abrasive

Particulate abrasive solids are employed as components of the present cleaning compositions and are dispersed and bound throughout the foam matrix by silane-coupling agents as described below. The choice of abrasive material may be made from a wide variety of materials of adequate hardness and of a particle size range which will enable them to effectively scour the flooring to loosen the wax and the direct or other debris bound thereto. The abrasive solids can comprise about 30-75% by weight of the aqueous reactant phase, preferably about 35-70% and most preferably about 40-65%. The weight ratio of abrasive to prepolymer which may be used is limited only by the ability of the foamed polymeric matrix to retain the abrasive particles without undue separation and loss of the solid during preparation, shipping or use. Preferably, the weight of the abrasive used will be from about 50-500% of the prepolymer weight, most preferably 200-350%. On a dry-weight (water-free) basis, the polyurethane foam matrix can comprise about 20-80%, preferably about 30-75% by weight of abrasive particles.

Due to the use of a silane-coupling agent to bind the preferred amounts of abrasive particles to the foam matrix, abrasive particles are preferably chosen from those substances which possess sufficient free surface Si-OH or Al-OH groups to form reactive sites for the silane-coupling agents. Among the substances that meet this requirement are the feldspar minerals, clays, quartz, aluminas, diatomaceous earths, sands, glasses, naturally-occurring and synthetic zeolites, zircon, carborundum, pumice and the like, which may be used singly or in mixtures. One or more components of the abrasive mixture can be selected for its ability to aid in the formation of a homogeneous, stable slurry. Such components include natural and synthetic clays such as those of the montmorillonite, saponite, hectorite and/or inosilicate classes, e.g., magnesium, calcium or sodium aluminum silicates. A preferred particulate abrasive for use in the foams of the present invention is F-4 feldspar (170-200 mesh) available from International Minerals and Chemical Corporation, Mundelein, Ill. The silane-treated abrasive solids are preferably introduced into the present cleaning compositions as components of the aqueous reactant phase, in which they are suspended prior to the foaming reaction, as described hereinbelow.

Silane Coupling Agent

The compositions of the present invention will also include a minor but effective amount of a silane-coupling agent which functions to bond to both the polyurethane matrix and the surface of the particles of the inorganic abrasive, thus chemically-coupling the abrasive into the polymeric matrix and preventing the abrasive particles from separating from the foam matrix during shredding, packaging or use. Silane-bound solid particles also clump less readily and so are more evenly dispersed throughout the solidifying matrix during the foaming reaction.

Useful silane-coupling agents may be selected from members of organosilicon monomers such as substituted-alkyl(trisalkoxy) silanes which can be characterized by the formula $RSiX_3$, wherein R is an organofunctional group attached to silicon in a hydrolytically stable manner and X designates hydrolyzable groups which are converted to silanol groups upon hydrolysis. Most commonly, R comprises a vinyl, methacryloxypropyl, 3,4-epoxycyclohexylethyl, 3-glycidoxypropyl, 3-mercaptopropropyl, 3-aminopropyl or 3-ureidopropyl moiety which may be further separated from the silicon group by one or two $-NH(CH_2)_n-$ moieties wherein $n=1-2$. Preferably X is an alkoxy group selected from the group consisting of methoxy, ethoxy, 2-methoxyethoxy or is acetoxy. Preferred silane-coupling agents are commercially-available from Union Carbide as the A-series, e.g., A1100–A1160, which include 3-aminopropyltriethoxysilane, 3-aminopropyltrimethoxysilane (also available from Dow Corning as Z-6020), N-2-aminoethyl-3-aminopropyltrimethoxysilane, or 3-ureidopropyl-triethoxysilane.

The silane-coupling agents are reacted with the particulate abrasive by adding the silane to a stirred slurry of the abrasive in the water used to form the aqueous phase. Preferably the initial slurry will include aCbout 40–90% of the total water used in the aqueous reactant phase. Completion of the hydrolysis reaction is assured by warming the slurry to at least about 70°–90° F. at which point the other components of the aqueous phase, e.g., the wax, surfactants, foam-structuring agents, solvents and the like may be added, along with the remainder of the water. When the abrasive solid particles are coated in this fashion, the free amino groups of the coupling agent bind to the polymeric chains of the substrate during the foaming step, i.e., when the aqueous reactant phase and the polyurethane prepolymer are mixed together.

Wax

The present composition will also include at least one wax which is incorporated into the foam shreds in an amount effective to deposit a coating of polish on the flooring. The wax will be present in the shreds in the form of an emulsion of wax solids in the interior and/or exterior phase, which is released from the shreds to deposit a wet film on the flooring which dries to a clear, glossy coating of polish.

Useful waxes will include one or more natural or synthetic waxes or wax analogs, including paraffin wax, montan wax, carnauba wax, beeswax, scale wax, ozokerite, Utah wax, microcrystalline wax such as plastic and tank bottom derived microcrystalline waxes, wax substitutes such as Fischer-Tropsch wax, polyalkylenes such as polyethylene, polypropylene, including blends and copolymers thereof. The wax will typically be introduced into the aqeuous reactant phase or into the external aqueous phase as a preformed aqueous emulsion.

For example, useful synthetic waxes include emulsions of polyethylenes such as those available from the Chemical Corporation of America, East Rutherford, N.J., under the designation Poly Emulsion ®. These aqueous emulsion contain about 20–45% solids and exhibit viscosities of about 10–250 cps maximum. Preferred members of this series include 10N30, 392N25, 392N35, 540N30, 629N40, and 392N35, where the number after "N" indicates the percentage of non-volatile materials present. Other useful, commercially-available polyethylene wax emulsions include members of the high-solids Poly-Em ® series (Rohm and Haas Co., Philadelphia, Pa.) such as Poly-Em ® 40 (40% solids, nonionic emulsifier) and Poly-Em ® 20 (40% solids, anionic emulsifier). Other preferred synthetic waxes include members of the A-C ® polyethylene series, particularly those polyethylenes which are water-emulsifiable due to oxidation (A-C ® 316A) or copolymerization with minor amounts of polar monomers such as acrylic acid (A-C ® 540, 540A, 40% solids; A-C ® 580 and 5120, 20% solids) and vinyl acetate (A-C ® 430 and 400). The A-C ® polyethylenes are available from Allied Chemical Corporation, Morristown, N.J. Blends of Poly Emulsion ® and Poly-Em ® polyethylenes have been found especially useful to provide the wax component for the present compositions.

Surfactants

Although the wax emulsions typically incorporate small amounts of emulsifying agents, one or more additional surfactants will also be incorporated into the aqueous reactant phase. These surfactants function to remove the window membranes of the foam cells, thus producing the desired reticulated, or highly open, structure. The surfactant also functions to enhance the cleaning power of the finished composition by dispersing soiled wax when the composition contacts the flooring. Foam-reticulating surfactants are preferably selected from nonionic types which are soluble or dispersible in water.

Preferred nonionic surfactants include the condensation products of ethylene oxide with a hydrophobic polyoxyalkylene base formed by the condensation of propylene oxide with propylene glycol. The hydrophobic portion of these compounds has a molecular weight sufficiently high so as to render it water-insoluble. The addition of polyoxyethylene moieties to this hydrophobic portion increases the water-solubility of the molecule as a whole, and the liquid character of the product is retained up to the point where the polyoxyethylene content is about 50% of the total weight of the condensation product. Examples of compounds of this type include certain of the commercially-available Pluronic ® surfactants (BASF Wyandotte Corp.), especially those in which the polyoxypropylene ether has a molecular weight of about 1500–3000 and the polyoxyethylene content is about 35–55% of the molecule by weight, i.e., Pluronic ® L-62.

Other preferred nonionic surfactants include the condensation products of $C_8$–$C_{22}$ alkyl alcohols with 2–50 moles of ethylene oxide per mole of alcohol. Examples of compounds of this type include the condensation products of $C_{11}$–$C_{15}$ fatty alkyl alcohols with about 3–45 moles of ethylene oxide per mole of alcohol which are commercially-available as the Poly-Tergent ® SLF series from Olin Chemicals or the Tergitol ® series from Union Carbide, i.e., Tergitol ® 15-S-20, 15-S-12, and 15-S-15, which are formed by condensing a $C_{11}$–$C_{15}$-fatty alcohol mixture with an average of 20, 12 and 15 moles of ethylene oxide, respectively.

Other nonionic surfactants which may be employed include the ethylene oxide esters of $C_6$–$C_{12}$ alkyl phenols such as the (nonylphenoxy)polyoxyethylene ethers. Particularly useful are the esters prepared by condensing about 8–12 moles of ethylene oxide with nonylphenol, i.e., the Igepal ® CO series (GAF Corp., New York, N.Y.).

Another useful class of nonionic surfactant is the silicone-glycol copolymers. These surfactants are prepared by adding poly(lower)alkylenoxy chains to the free hydroxyl groups of dimethylpolysiloxanols and are available from the Dow Corning Corp. as Dow Corning 190 and 193 surfactants (CTFA name: dimethicone copolyol.)

Other useful nonionics include the ethylene oxide esters of alkyl mercaptans such as dodecyl mercaptan polyoxyethylene thioether, the ethylene oxide esters of fatty acids such as the lauric ester of polyethylene glycol and the lauric ester of methoxypolyethylene glycol, the ethylene oxide ethers of fatty acid amides, the condensation products of ethylene oxide with partial fatty acid esters of sorbitol such as the lauric ester of sorbitan polyethylene glycol ether, and other similar materials, wherein the mole ratio of ethylene oxide to the acid, phenol, amide or alcohol is about 5–50:1.

The total amount of nonionic surfactant which is incorporated into the present foams is preferably about 0.5–20%, most preferably 1–10% by weight of the aqueous phase.

In addition to one or more nonionic surfactants, the foams of the present invention can incorporate an effective amount of one or more anionic surfactants in amounts equal to about 0.5–5% preferably about 1–3% by weight of the aqueous phase.

Amphoteric detergents and cationic detergents may also be incorporated into these hydrophilic foams. These detergents will be employed in a compatible proportion and manner with the nonionic and anionic surfactants, and may comprise about 0.5–10%, preferably 1–5% of the aqueous phase.

Silicone Fluid

Silicone fluids can also be employed as foam cell initiating and structuring agents and are selected from those which function to control cell size and aid reticulation. These fluids can also function to break up wax coatings or deposits of oily or greasy soils. Useful classes of silicone fluids include the linear polydimethylsiloxanes or the tetrameric or pentameric cyclic siloxanes (cyclomethicones) which are available from Rhone-Poulenc, Inc. (Monmouth Junction, N.J.) as the Rhodorsil ® 200 fluid series or from Dow Corning in a wide range of viscosities (i.e., 10–10,000 cps.). An especially preferred polydimethylsiloxane is Dow Corning ® 200 fluid (50 cps). When used as a component of the present foams, about 0.1–20%, preferably 1–10% by weight of the aqueous phase of a silicone fluid of about 0.5–150 cps viscosity, preferably about 25–100 cps, can be employed.

Solvent

About 1–20% by weight of the aqueous phase may also consist of an organic solvent such as kerosene, mineral spirits, lower alkanols, paraffin oil, methyl carbitol, butyl carbitol, lower(alkyl)cellusolves, m-pyrol, tetrahydrofurfuryl alcohol (THFA), or a similar aromatic or aliphatic solvent or solvent mixture. The solvent functions to aid in the solubilization and removal of heavy waxy deposits and also assists in the application of an even coating of the wax. Preferably, the solvent will be selected from those which are water-soluble, e.g. the lower(alkyl)carbitols, THFA and the like, since such solvents substantially assist the solubilization or dispersal of the water-insoluble components of the aqueous reactant phase.

Fragrance

Minor but effective amounts of an odoriferous agent selected so as to be chemically-compatible with the above-described surfactants are preferably included in the aqueous phase. Useful fragrances will include, for instance, about 0.5–2%, preferably about 0.1–1.5% of floral oils such as rose oil, lavender, lilac, jasmine, wisteria, lemon, apple blossom, or compound bouquets such as spice, citrus, pine, aldehydic, woody, oriental, and the like.

Minor amounts of other foam-compatible adjuvants, such as dyes, biocides (preservatives and/or disinfectants) and the like, may be introduced into the present foam products in effective amounts either via the aqueous reactant or resin phase, via the exterior aqueous phase or by treating the final product with the adjuvants as by spraying, mixing, etc. When employed in the present products, such adjuvants can be present at levels of up to about 5–10% by weight of the finished product.

Therefore, useful aqueous reactant phases can comprise about 20–50%, preferably about 24–45% water; 35–65% by weight of abrasive particles which have been surface-treated with about 0.1–5% by weight of the abrasive of a silane-coupling agent; about 1–15% wax, preferably about 2–10% wax, (solids); about 1–10% by weight of a nonionic surfactant, about 1–10% of a silicone fluid, about 1–15% of an organic solvent, preferably a water-soluble solvent, and minor amounts of dye and/or fragrance and/or preservative. Alternatively, the wax solids can be omitted from the aqueous reactant phase and absorbed into the cured foam shreds in the form of an aqueous emulsion to the extent of about 20–50% by weight of the shreds. The wax solids content of the exterior aqueous phase will preferably fall within the range of about 1–15%.

Preparation

In a typical procedure, a slurry is formed of about half of the total water and the abrasive particles which is then treated with the silane-coupling agent with stirring and heating sufficient to surface-coat the abrasive with the silane. Additional water is then added, followed by the nonionic surfactant, the silicone fluid, the solvent, and the aqueous wax emulsion. The fragrance, dye and preservative, if any, are then added to the stirred slurry.

The stirred aqueous reactant phase is brought to about 60°–85° F. and blended in the desired weight ratio with the heated (90°–110° F.) prepolymer resin in the mixing chamber of a foam-spraying machine. The foaming, exotherming mixture is sprayed into open or closed forms and allowed to set at ambient temperatures.

The cured foam buns formed by this process are of relatively high density (i.e., about 0.2–0.6 g/cc) but have a much lower tensile strength than is normally desirable or obtained for other polyurethane-type foams. Buns of polyurethane foams which have been formulated so as to retain their integrity as, for example, sponges, abrasive pads, padding and the like typically exhibit tensile strengths of about 30–60 psi as measured by standard ASTM methods (D162372), whereas the foam buns of the present invention have tensile strengths of less than about 10 psi, preferably less than 8 psi, most preferably less than 3 psi. These low tensile strengths permit the buns to be facilely shredded without the expenditure of undue effort and yield shreds which are soft and somewhat self-adhering; properties which are useful to ensure complete coverage of the floor area without undue scattering, and easy pickup of the shreds after they have performed their cleaning function. The preferred shredded foam particle size for the present compositions is about 5–15 mesh, most preferably about 6–10 mesh (U.S. Standard Sieve series).

Foam buns as prepared within the above-described parameters yield shreds within a useful free-flow bulk density range of about 0.1–0.5 g/cc, preferably 0.15–0.30 g/cc, as measured by gravity-tapping down a column of freshly prepared shreds three times at ambient temperature. The most dense shreds are prepared when the ratio of aqueous phase to prepolymer resin is at the higher portion of the useful range for any given proportion of abrasive incorporated within the aqueous phase. Lower ratios of aqueous phase to prepolymer will likewise produce less-dense, fluffier foams. For example, for an aqueous phase incorporating about 50-70% powdered mineral solids as the abrasive, the useful weight ratio of aqueous phase to a Hypol-type prepolymer is about 20:1 to about 1:1, preferably 10-2:1.

Alternatively, solids-loaded base shreds may be prepared which omit the wax solids, while employing about the same total amount of water in the aqueous reactant phase. After curing, the shreds are contacted with an aqueous wax emulsion, in order to introduce the exterior aqueous phase into the cell voids of the shreds. The exterior aqueous phase can be absorbed into the shreds by any convenient method, as by spraying or dipping. The exterior aqueous phase can comprise about 10-50% of the weight of the foam shreds, preferably about 20-45%. The exterior, or absorbed aqueous phase can also include minor amounts of liquid cleaning adjuvants such as solvents, surfactants and the like. However, it is highly preferable to incorporate these materials in the interior aqueous phase in order to enhance the ease of preparation of the composition, to control the physical characteristics of the foam and to promote the integrity of the polyurethane foam matrix. Therefore, it is normally preferred that, as added to the foam shreds, the exterior aqueous phase consists essentially of an aqueous wax emulsion.

After introduction of the exterior aqueous phase, the composition will have a free-flow bulk density of about 0.15-0.5 g/cc, preferably about 0.2-0.35 g/cc.

The resultant foam compositions remain substantially free-flowing and are only slightly moist to the touch both before and after use. When contacted with waxed flooring surface and applied thereto under conditions of mild pressure, e.g., by mechanical buffing, the foam shreds remove the soiled dry wax and coat the surface with a fresh coating of wax while retaining their structural integrity. The shreds are then removed from the surface and discarded.

The invention will be further described by reference to the following detailed examples.

EXAMPLE I

INTERIOR PHASE WAX INCORPORATION

A reaction kettle equipped with turbine stirring was charged with 78.8 lbs. of water, and 219.10 lbs. of powdered F-4 feldspar was slowly added with rapid stirring. The mixture was heated to 77° F. via external steam heat and 1.12 lbs. of n-2-aminoethyl-3-aminopropyl-trimethoxysilane (Dow Z-6020) added with continued agitation. After 0.5 hr., the slurry was sequentially treated with 19.8 lbs. of water, 9.24 lbs. Pluronic ® L-62 nonionic surfactant, 12.39 lbs. Dow 200 silicone fluid (50 cps.), 6.93 lbs. butyl carbitol, 1.02 lbs. of Nuosept ® 95 preservative (Nuodex, Inc., Piscataway, N.J.), 1.47 lbs. citrus fragrance and 0.11 lb. of blue dye (Calcotone blue GP paste). After stirring to homogeneity, a 69.0-pound portion of the slurry was blended with 22.8 lbs. of a 1:1 mixture of Polyemulsion ® 392N35 and Poly Em ® 40 (37.5% total solids). The mixture was stirred for one hour to a rich foam-like consistency. The 77° F. aqueous reactant phase was combined in a 5:1 ratio with Hypol FHP 3000 prepolymer resin (90° F.) in the mixing chamber of a foam-spraying machine. Portions of 4.3-4.4 lbs. were sprayed into 17.5"×3.5"×8" polyethylene-lined boxes to form buns which set and were de-boxed after 5 minutes. The flexible buns were allowed to cool to room temperature and then were fed into a rotary blade shredder to form 4-20 mesh shreds, preferably about 8-12 mesh shreds of an open-celled, dense foam.

Laboratory vinyl tile flooring was washed with a solution of Spic 'N Span ® detergent and ammonia, rinsed with water and allowed to dry thoroughly. The starting point for the waxing test was established by determining light reflectance with a "Photovolt" reflection meter. The average initial reflectance was determined to be 10.43 (5.0 readings per 1 sq. ft. tile). The product of Example I (10.0 g) was applied to the floor tiles by hand using a circular motion for 2.0 minutes. The product was removed from the flooring and the wet wax film buffed for 1.0 minute with a portable electrical buffing machine. The average final reflectance was determined to be 24.1, an increase in gloss of 13.0 units.

The pressure-application of the shreds to soiled, prewaxed vinyl flooring by the buffing machine is also effective to remove and pick up the soiled wax from the tiles while depositing an even, glossy coating of fresh wax on the tiles.

The invention has been described with reference to various specific and preferred embodiments and techniques. However, it should be understood that many variations and modifications may be made while remaining within the spirit and scope of the invention.

What is claimed is:

1. A process for preparing a floor cleaning and waxing composition comprising:
   (a) forming an aqueous reactant phase comprising about 30-75% by weight of abrasive solid particles, about 0.1-5% of the weight of the solid particles of a silane-coupling agent, about 0.1-10% of a nonionic surfactant, about 0.1-20% of a silicone fluid, about 5-15% wax and about 20-50% water;
   (b) mixing said aqueous reactant phase with a water-foamable prepolymer resin which contains at least 2 free isocyanate groups per resin molecule so that the final mole ratio of water to total free isocyanate groups is within the range of about 5-100:1, thereby shaping said resin into a hydrophilic, open-celled, highly reticulated polyurethane foam bun; and
   (c) shredding said foam bun.

2. The process of claim 1 wherein said composition has a density of about 0.15-0.3 g/cc and a shred size of about 5-15 mesh.

3. The process of claim 1 wherein the aqueous phase further comprises about 1-20% of an organic solvent.

4. The process of claim 1 wherein said aqueous reactant phase is formed by slurrying the solid particles with about 50-70% of the total water, adding the silane-coupling agent, stirring and heating the water phase to about 70°-90° F. and adding the surfactant, the silicone fluid and an emulsion of the wax in the remainder of the water.

5. The process of claim 1 wherein the solid particles comprise silaceous mineral particles and said silane-coupling agent is an aminoalkyl(tris-alkoxy)silane.

6. A process for preparing a floor cleaning and waxing composition comprising:
   (a) foaming an aqueous reactant phase comprising about 30-75% by weight of abrasive solid particles, about 0.1-5% of the weight of the solid particles of a silane-coupling agent, about 0.1-10% of a nonionic surfactant, about 0.1–20% of a a silicone fluid and about 20–50% water;
(b) mixing said aqueous reactant phase with a water-foamable prepolymer resin which contains at least 2 free isocyanate groups per resin molecule so that the final mole ratio of water to total free isocyanate groups is within the range of about 5–100:1, thereby shaping said resin into a hydrophilic, open-celled, highly reticulated polyurethane foam bun;
(c) shredding said foam bun; and
(d) absorbing an aqueous wax emulsion into said shredded foam.

7. The process of claim 6 wherein the aqueous reactant phase further comprises about 1–20% of an organic solvent.

8. The process of claim 6 wherein the aqueous wax emulsion is about 20–50% by weight of said shredded foam.

9. The process of claim 8 wherein the aqueous wax emulsion comprises about 1–15% by weight wax.

10. The process of claim 6 wherein said composition has a density of about 0.20–0.35 g/cc and a shred size of about 5–15 mesh.

11. The process of claim 6 wherein the aqueous reactant phase is prepared by slurrying the abrasive particles with about 50–90% of the water, adding the silane-coupling agent to the slurry, stirring and heating the slurry to react the coupling agent with the abrasive particles, and adding the remainder of the water, the surfactant and the silicone fluid.

12. The process of claim 6 wherein the aqueous reactant phase further comprises about 1–15% of an organic solvent.

13. The process of claims 1 or 6 wherein the weight range of aqueous phase to prepolymer resin is about 10–2:1 and wherein the abrasive mineral particles comprise about 40–65% by weight of the aqueous phase.

14. The floor cleaning and waxing composition formed by the process of claims 1 or 6.

* * * * *

UNITED STATES PATENT AND TRADEMARK OFFICE
CERTIFICATE OF CORRECTION

PATENT NO. : 4,537,914
DATED : August 27, 1985
INVENTOR(S) : James A. Smith et al It is certified that error appears in the above-identified patent and that said Letters Patent is hereby corrected as shown below:

In Column 1, line 63, for "particularly" read --preferably--

In Column 5, line 10, for "aCbout" read --about--.

In Column 10, line 44, for "shaping" read --converting--.

In Column 11, line 8, for "shaping" read --converting--.

Signed and Sealed this

Twenty-seventh Day of May 1986

[SEAL]

*Attest:*

DONALD J. QUIGG

*Attesting Officer*   *Commissioner of Patents and Trademarks*